US009093188B1

(12) United States Patent
Holland (10) Patent No.: US 9,093,188 B1
(45) Date of Patent: Jul. 28, 2015

(54) WIRING HARNESS HAVING INTERCHANGEABLE CONNECTORS

(71) Applicant: i-Lighting, LLC, North East, MD (US)

(72) Inventor: Scott D. Holland, North East, MD (US)

( * ) Notice: Subject to any disclaimer, the term of this patent is extended or adjusted under 35 U.S.C. 154(b) by 0 days.

(21) Appl. No.: 14/188,675

(22) Filed: Feb. 24, 2014

Related U.S. Application Data

(63) Continuation-in-part of application No. 12/928,637, filed on Dec. 14, 2010, now abandoned.

(60) Provisional application No. 61/403,333, filed on Sep. 14, 2010, provisional application No. 61/286,302, filed on Dec. 14, 2009.

(51) Int. Cl.
*H01R 11/00* (2006.01)
*H01B 7/00* (2006.01)

(52) U.S. Cl.
CPC .............. *H01B 7/0045* (2013.01); *H01B 7/009* (2013.01); *H01R 11/00* (2013.01)

(58) Field of Classification Search
USPC ................................... 439/502–506; 362/225
See application file for complete search history.

(56) References Cited

U.S. PATENT DOCUMENTS

| 3,097,035 | A  | * | 7/1963  | Despard    | 439/378    |
| 6,503,098 | B2 | * | 1/2003  | Aoki et al.| 439/502    |
| 6,540,549 | B2 | * | 4/2003  | Rupert     | 439/502    |
| 7,819,553 | B2 | * | 10/2010 | Lexso      | 362/249.14 |
| 7,905,736 | B2 | * | 3/2011  | O'Rourke   | 439/214    |
| 8,840,266 | B1 | * | 9/2014  | Wheeler    | 362/225    |

* cited by examiner

*Primary Examiner* — Chandrika Prasad
(74) *Attorney, Agent, or Firm* — Law Office of Jeffrey R. Ramberg (57) ABSTRACT

A low voltage lighting apparatus, and its novel components, for decks and railings stairs or steps, both outdoor and indoor. One aspect of the invention pertains to various wiring harness designs used to conveniently hook up the lighting apparatus. A wiring harness permits the easy swapping out of defective components such as burned out light bulbs, and is customizable in terms of size and shape. Another aspect of the invention pertains to arrangements for placing most of the wiring behind the steps of a staircase, and below the deck surface, or for otherwise concealing wiring that is in front of a step, or above the deck surface.

16 Claims, 8 Drawing Sheets

WIRING HARNESS HAVING INTERCHANGEABLE CONNECTORS

CROSS-REFERENCE TO RELATED APPLICATIONS

This patent document is a Continuation-in-Part of U.S. patent application Ser. No. 12/928,637, filed Dec. 14, 2010, which claims the benefit of commonly owned U.S. Provisional Patent Application No. 61/403,333, filed Sep. 14, 2010, as well as commonly owned U.S. Provisional Patent Application No. 61/286,302, filed Dec. 14, 2009, all in the name of Scott D. Holland et al. The entire contents of the parent patent applications are expressly incorporated herein by reference.

BACKGROUND OF THE INVENTION

1. Field of the Invention

The present invention relates to artificial, i.e., non-natural, lighting systems, and more specifically to wiring harnesses for low voltage lighting systems.

2. Discussion of Related Art

Many American homes have outdoor decks or patios. Even if the decks are not significantly elevated with respect to the ground, they often feature railings. The railings are supported every few feet by vertical posts, often consisting of four-inch square lengths of wood. For new construction, American construction codes call for the spacing between adjacent posts to be not more than six to eight feet.

Americans enjoy their decks and patios. Among other reasons, they enjoy the outdoors without having to venture far from home. In recent years, it has become possible and desirable to provide lighting of the deck or patio area so that people can enjoy their decks and patios after sunset.

Manufacturers have responded to this demand by selling lighting for decks or patios. The kits are intended for installation by contractors or do-it-yourselfers. These kits suffer from a number of shortcomings.

Decks come in all kinds of different designs, but lighting manufacturers prefer to sell a standard kit. Thus, their kit tends to be generic, with the homeowner or installer left to customize the kit. In practice, this means that the homeowner or installer must cut wires to their proper length, strip the ends, connect bare wires to one another, splice one wire into another, etc. This is extremely labor-intensive, a complaint aired by commercial installers, who may be carpenters or other professional deck installers, and not necessarily electricians. Further, the resulting electrical connections likely will not be waterproof, and may not even be water-resistant. Keeping water or other moisture out of the electrical connections is important, but difficult to accomplish in an outdoor environment. Still further, the connections likely will not be as secure as those prepared in advance in a manufacturing facility.

US. Patent Application Publication No. US2009/0147504 to Teeters discloses devices, systems, apparatus and methods for installing LEDs to glass blocks and tiles. The LEDs are provided as a plurality arranged on a strip, with a pair of electrical conductors extending out each end of the strip. In one embodiment, one end may feature a pair of sockets, and the other end a pair of plugs or prongs, similar to a household extension cord. In an alternate embodiment, there is a pair of sockets on both ends of the LED light strip, and strips are connected together with an adapter placed between, the adapter featuring a pair of prongs extending out both sides (e.g., top and bottom) of adapter. The second embodiment lends greater interchangeability (the LED light strip can be oriented/connected in either direction), but fails to solve the polarity problem, making sure that polarity is correct, something that is critical for LEDs.

U.S. Pat. No. 3,190,978 to Huget discloses an electrical connecting means with identical rotary connections. In one embodiment is a quick-release electrical coupling. The coupling is provided in two parts that are identical and rotate or pivot with respect to each other. The parts can be coupled together when oriented at an acute angle with respect to each other. When so coupled and then straightened out to a linear relationship, the parts are locked together and cannot be pulled apart. When DC circuits are involved, provision is made for ensuring correct electrical polarity. But the design of this system is complex, and the average do-it-yourselfer or deck contractor would prefer connectors that simply plug together in a linear fashion, and not at an acute angle. Further, the pivoting capability of Huget is not needed in the present lighting application.

The instant invention addresses and solves these problems.

SUMMARY OF THE INVENTION

In accordance with the present invention, what is provided is a wiring harness used to conveniently hook up the lighting apparatus, for example, for a low voltage lighting system associated with landscape or hardscape lights, or decks or stairs or railings

BRIEF DESCRIPTION OF THE DRAWINGS

FIG. 7 illustrates a LED lighting unit featuring three LED lights where the end lights are arranged to shine from 45 to 120 degrees to the left and right, and all three lights are arranged to shine about 15-30 degrees out (forward) from the vertical by virtue of the housing for the lighting unit deviating from orthogonal by that amount. In particular, FIG. 7A provides an orthoscopic view.

DETAILED DESCRIPTION OF THE INVENTION

The present invention features at least three aspects or components, with at least some of the aspects enhancing the performance or functionality of other aspects. In accordance with a first aspect of the present invention, a low voltage lighting apparatus is provided for decks and railings and outdoor stairs or steps, the stairs or steps typically being associated with the deck. Another aspect of the invention pertains to the wiring harness used to conveniently hook up the lighting apparatus, and which harness permits the easy swapping out of defective components such as burned out light bulbs. Still another aspect of the invention pertains to arrangements for placing most of the wiring behind the steps of a staircase, and below the deck surface, or for otherwise concealing wiring that is in front of a step, or above the deck surface.

The electrical conductors typically are wired in an electrically parallel arrangement, the electrical connectors are interchangeable; and the wiring harness is weather resistant. The interchangeability of the electrical connectors makes the system expandable. In particular, if a single wiring harness does not have sufficient electrical leads and connectors for the number of lamps desired, one or more additional wiring harnesses may be added to the first harness, and at any connector position along the first harness. Unneeded or excess pairs of electrical conductors terminating in unused electrical connectors can be capped off. A small wiring harness having at least the minimum number of connectors for expandability may be termed a "wiring harness module".

For ease of manufacture, a wiring harness may contain a standard number of electrical connectors, whether it be 6, 8, 10, 20 or some other number; however, 8 connectors may be the practical limit. Further, each electrical connector is the same style; that is, it is interchangeable with any other connector. A two-lead molded electrical connector similar to those often found on boat and camper trailers has been found to work well, and is weather resistant.

The wiring harness consists of a length of two-conductor wire, terminating on each end with an electrical connector. Additional connectors are spliced into the "main" electrical lead, at regular intervals, for example, about every five feet (60 inches). This distance is chosen because it is more than enough length for the vertical supports of a deck that have a US standard spacing of about six feet. About a foot of additional electrical two-conductor material is provided between each additional connector and the splice. Although referred to as the "main" electrical conductor, in fact all wires making up the wiring harness may be of the same gauge, for simplicity. Thus, an eight-connector wiring harness would feature six connectors spliced into the main electrical line, and would be capable of illuminating seven light units.

Where more than this number of light units are to be powered, the answer is simply to provide additional wiring harnesses. Further, the wiring harnesses do not need to be plugged in end-to-end, but can be plugged to one another in the arrangement that best reflects the positioning of the light units. Thus, for example, where 17 light units are to be powered, three 8-connector wiring harness will do the job. In the first wiring harness, one connector goes to the power supply, one lead goes to the second wiring harness, and six connectors go to light units. In the second harness, one connector connects to the first wiring harness, one connector goes to the second wiring harness, and six connectors go to light units. In the third wiring harness, one connector connects to the second wiring harness, five connectors go to light units, and the two remaining connectors are capped off with weather resistant plugs, which look just like regular connectors except no electrical leads are present.

Another form of wiring harness intended to be included in the present invention is a wiring harness "extension", sometimes referred to as a "jumper harness". This form of wiring harness is similar to a household extension cord, at least in the sense that it features at least two electrical conductors (e.g., wires) terminating in an electrical connector at each end of the wire. At least one of the electrical connectors is designed to engage ("i.e., "plug into") an electrical connector of a wiring harness (for lights). The engagement preferably is linear, that is, parallel to the longitudinal axis of the wire. The electrical connectors may feature prongs, pins and/or sockets. The prong(s) may be bulged, flared or expanded along a portion of its length to help hold the prong in engagement with the corresponding socket into which it is plugged. Alternatively or in addition to the foregoing, the socket(s) may feature a crimp, narrowing or constriction along a portion of its length to help hold the prong in engagement with the socket. Further, the two electrical connectors may be identical to each other. A wiring harness extension may be useful where there is an extended distance between the power supply and the first LED to be illuminated, or where there is an extended distance between two or more LEDs to be illuminated.

Figure 1:
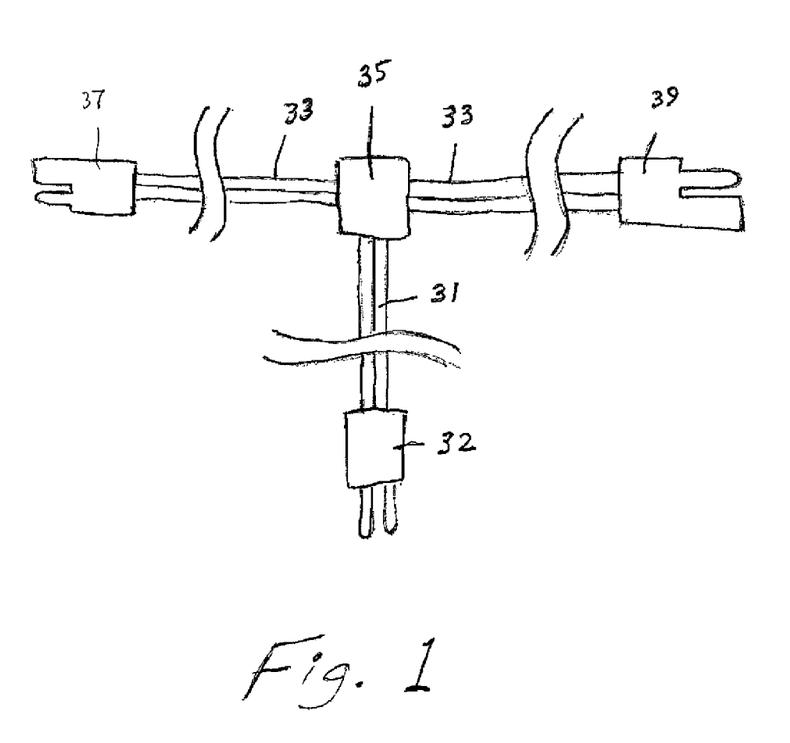
FIG. 1 is a plan view of a "T" harness module.

In an alternate embodiment, the basic unit of the wiring harness is simplified and standardized to the form of a fundamental unit or "module" that it has leads terminating in three electrical connectors or "plugs" arranged in the shape of the letter "T". Thus, such a wiring harness unit is termed a "T" harness module. Referring now to FIG. 1, the "T" harness module features a segment 31 of two-conductor wire, generally a shorter section, spliced in the middle of another section 33 of two-conductor wire, generally a longer section. The splice may be protected from the elements by housing 35. One end of the "another section" of two-conductor wire terminates in an electrical connector which is designed to connect to the previous "T" harness module, or to a wiring harness extension, or to the power supply. The other end of the "another section" 33 terminates in an electrical connector which is designed to connect to the next "T" harness module down the line, or to a wiring harness extension, or to the weather-resistant terminal cap. The connectors may be interchangeable, that is, identical. Further, each connector may feature a plug, prong or pin for one of the conductors and a socket or receptacle for another conductor.

Figure 2A:
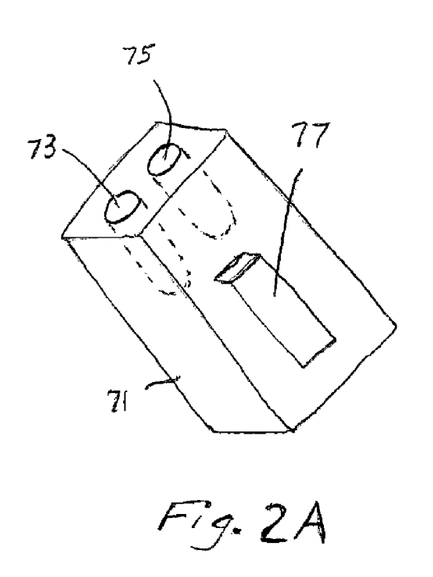
FIGS. 2A and 2B are isometric views of two different styles or designs of electrical connectors.

The 2-conductor wire 31 that is spliced in the middle may connect to an electrical load, or to another wiring harness or extension (jumper) harness (not shown). Generally, it also terminates in electrical connector 32, here shown as a male connector having two prongs. Such an arrangement is convenient when connector 32 is connected to an electrical load such as a lamp, for ease in swapping out a burned out lamp for a new one. The electrical connector may be of any design. An alternate design is shown in FIG. 2A featuring a receptacle 71 having two sockets 73, 75, and a quick-release locking tab 77.

Figure 2B:
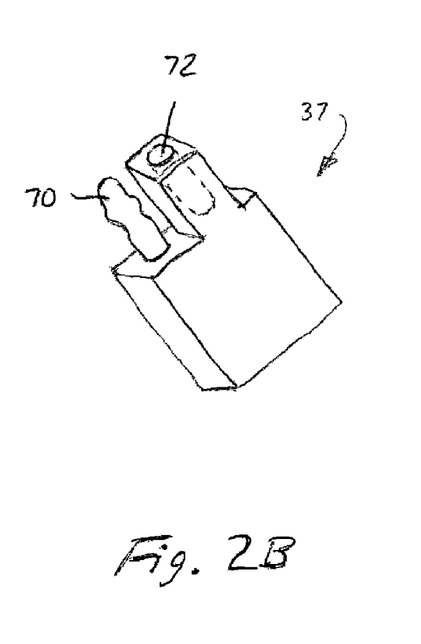

FIG. 2B shows an enlarged isometric view of connector 37. It features prong 70 and socket 72. Prong 70 is embedded partially in base 74, and socket 72 is defined by extension 76 of base 74. Socket 72 has a liner of metal (not shown) to provide for electrical connection. This lining and prong 70 may be nickel plated for corrosion resistance. The base and extension may be stiff but slightly resilient plastic which may be injection molded around the metal lining and the bottom portion of the prong. The prong 70 may have an expanded or bulged-out region so that when it is inserted into the socket of the corresponding connector, it slightly expands the metal lining and socket, thereby sealing the socket from the ambient environment, which may enhance the weather resistance of the electrical connector.

When electrical connector 32 is identical to connectors 37 and 39, one can see that a single "T" harness can be connected to two additional "T" harnesses, thus giving rise to "branching". Among the uses of branching is where there are a plurality of electrical loads to be supplied in a localized region. This special situation of a "T" harness having all identical connectors is then called a "Y" harness.

Again, among the purposes of the electrical connectors is to ease and facilitate installation and maintenance of lighting systems. For example, a LED lamp may burn out, and with electrical connectors, it is an easy matter to replace the entire LED lighting module. The electrical connectors of the present invention do not require disassembly; at most, they require pulling up on a tab to disengage a latch or latching mechanism. The connectors connect or plug together in a linear fashion, that is, parallel to, or in line with, the longitudinal axis of the electrical conductors. In general, friction is sufficient to keep the connectors connected to one another; however, tabs or latches may be incorporated into the connection design for further attachment security.

LEDs are polarity-sensitive devices, operating on direct current. If they experience alternating current or the improper polarity of DC electricity, they may not function, or may be damaged. With the arrangement depicted in FIG. 3, the correct polarity is virtually guaranteed. In different situations, however, this guarantee may not apply. For example, if the power cable did not plug into the power supply but instead featured individual wires that are connected to the power supply by inserting the bare leads of the wires making up the power cord into the red and black connectors on the power supply, then the opportunity exists for mistakenly reversing the wires and thus providing DC current of the wrong polarity to the LEDs. (Press on the red or black tab, insert bare wire, and release tab.)

Figure 4:
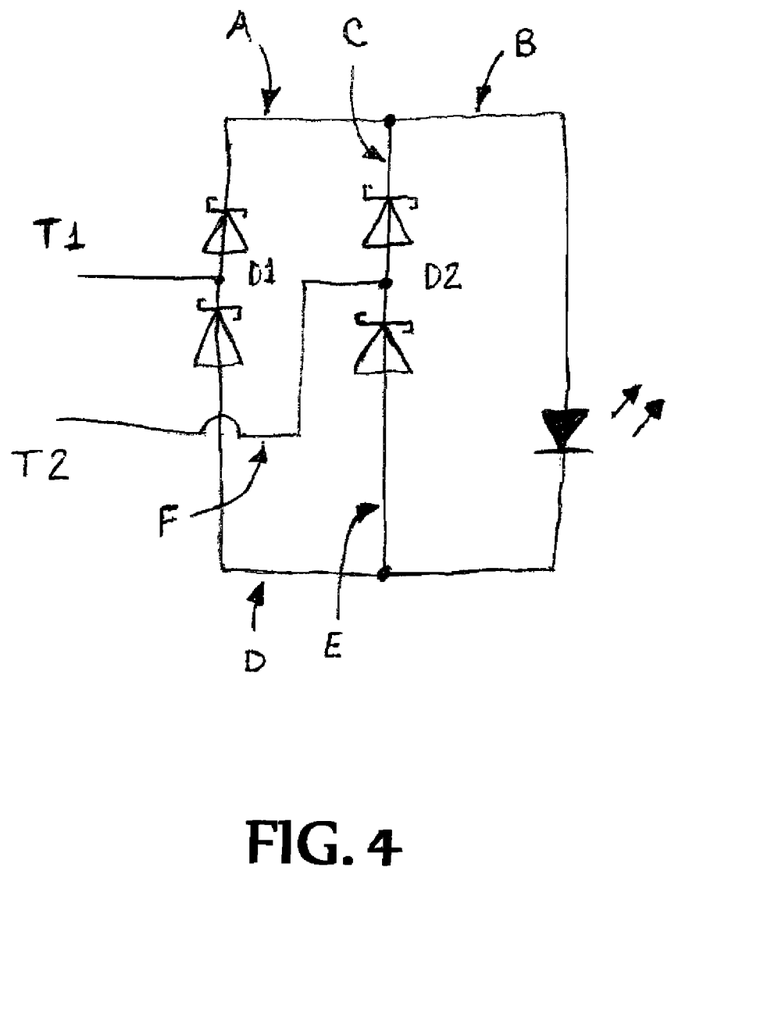
FIG. 4 is a schematic diagram of an electrical circuit that can "correct" an improper polarity by inverting the applied (improper) polarity.

In another aspect of the invention, this possibility of error is recognized and remedied by providing the wiring harness with polarity-correcting circuitry. The circuitry can be housed in housing 35. FIG. 4 shows an electrical schematic diagram of a circuit that can invert or "reverse" the polarity of an applied DC voltage, if such applied DC voltage is of the "wrong" polarity. Thus, this circuit can, in essence, "correct" an applied DC voltage of the wrong polarity.

The wiring harness embodiments of the instant invention are used with other components to produce illumination of a surface such as a deck, and/or to illuminate a set of associated stairs or steps, and/or illuminate a set of indoor stairs or steps. The instant wiring harness may be used for landscape lighting and/or hardscape lighting, e.g., lighting stone, brick or cement structures such as walls or buildings. The overall system features a power supply that supplies and controls the low voltage electrical energy, lights that attach to the vertical supports for the deck railing or to the railing itself, one or more of the instant wiring harnesses, and optionally additional means, e.g., electrical conductors or "power cords" for distributing the electrical energy from the control box to the first wiring harness.

The power supply may be part of, or a supplement to, a control box designed for "automatic" control of the lighting apparatus. Such a control box may need to convert electrical energy from one form to another (AC to DC, or high voltage AC to low voltage AC for example); it may need to change the voltage supplied to it for use with relatively low voltage lights, such as lights that run on DC power, and it may be designed to switch the electrical energy on or off in response to an operator-controlled switch or a photocell.

The 9-24 volt AC or DC power for the lights operation may be "automatic". That is, the operation is controlled by a photocell, turning the lights on when the photocell senses insufficient ambient light (as measured by light falling on the photocell), and turning the lights off when the photocell senses sufficient ambient light.

In one embodiment, the power supply is housed in the control box. In an alternate embodiment, the power supply is not housed within the control box, but instead is provided separately. In particular, a typical power supply for use in the instant invention is one that converts 120 volts AC to low voltage direct current (DC) or low voltage AC, for example, 12 volts DC. Thus, the control box can be supplied with 12 volts, and it puts out or supplies the light assembly circuits with 9-12 volts, all DC current. For lights that require direct current, such as light emitting diodes (LEDs), another option is to supply the system with low voltage AC power, and rectify the AC to DC at or near the LEDs themselves, for example, with diodes that are part of the circuitry of the housing supporting the LED(s).

In the Examples to follow, the "control box" is greatly simplified, and consists essentially of a photocell or other known-in-the-art "light sensor" that turns a power supply on and off in response to the level of ambient light available. The power supply steps down the voltage from house current levels (110-277 volts), and rectifies it from alternating current (AC) to direct current (DC). The power supply may be waterproof or water-resistant.

The light for illuminating the deck, railing or vertical support (sometimes referred to as the "post") may be provided in the form of a LED. In one embodiment, three LEDs may be mounted in a housing made of plastic such as high impact polystyrene (HIPS). The type of plastic, however, is not thought to be particularly critical, and other polystyrenes or other high-impact plastics or even other plastics having similar properties or reasonably high strength should function in an acceptable manner. One LED may be arranged to shine in a generally downward direction, and the other two may be arranged or oriented to shine at an angle such as at a 15 degree, 30 degree or even 45 degree angle or thereabouts and to the left or to the right of the vertical, thereby illuminating the deck to the left and to the right of the illumination spot of the center light.

Figure 7A:
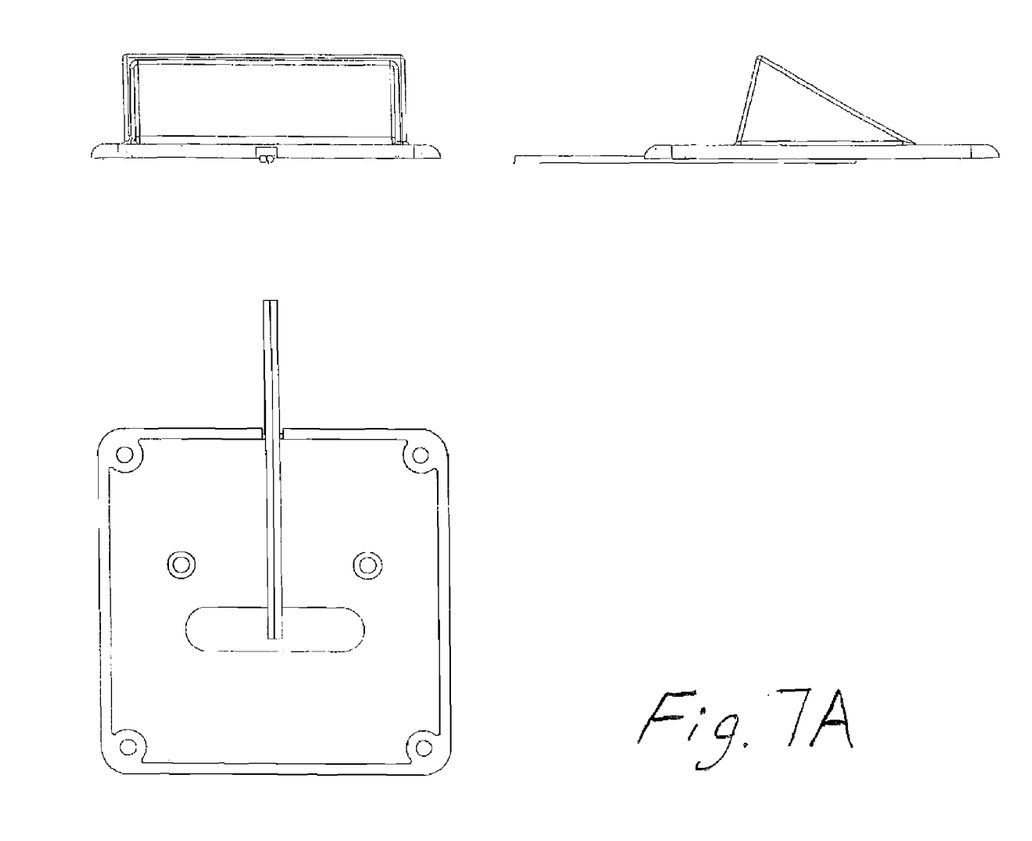
Figure 7B:
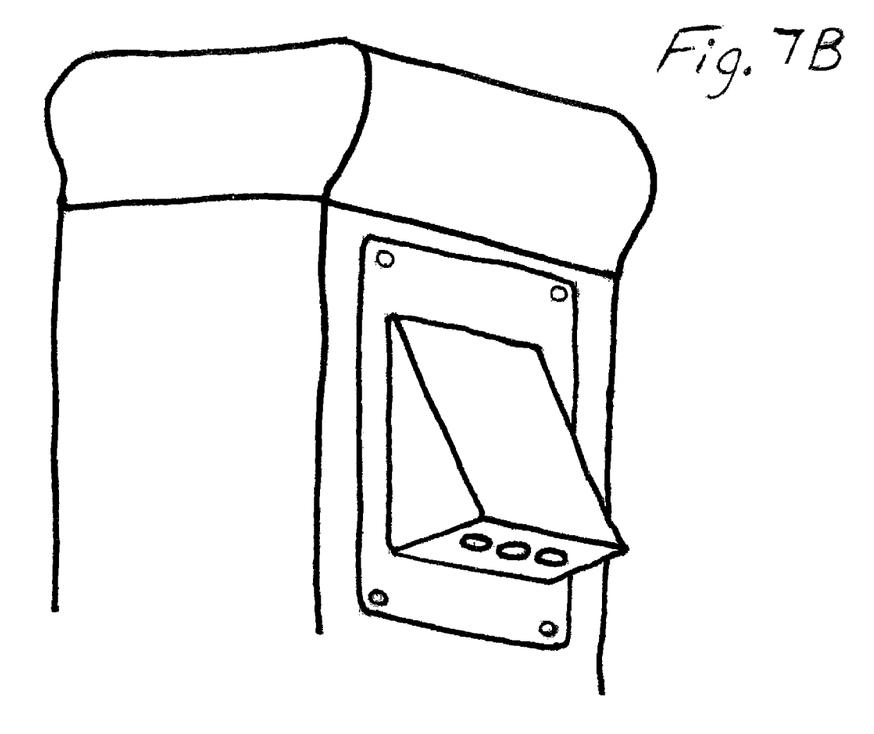
FIG. 7B shows a perspective view as-installed on a deck post.

In the specific embodiment of illuminating a surface of a deck from a vertical post, the light may be directed onto the deck surface at an angle of about 15 to 30 degrees from the vertical as viewed in profile (e.g., from the side of the light assembly), or in other words, about 15 to 30 degrees forward or outward from the perspective of a viewer positioned behind the vertical post and looking toward the post. One or more lamps may be mounted in a housing, and the combination arranged to shine in this range of angles, either by tilting the housing or tilting the lamps within the housing. The housing itself may feature an angle somewhat off or away from a right angle. For example, at least one side of the housing may be angled at about a 15-30 degree angle so that the light does not shine down vertically, but rather at an angle about 15-30 degrees from the vertical, out in a forward direction as viewed from the perspective of a person positioned behind the vertical support. Stated in the alternative, this amount of forward "tilt" can best be seen when viewed in profile, that is, from the side. This type of housing is shown in FIGS. 7A and 7B. FIG. 7A provides an orthoscopic view (bottom, side and back views) of the light assembly housing. FIG. 7B gives a perspective view of the housing as mounted on a vertical post of a deck. The housing may be provided with a transparent or translucent diffuser plate, lens or cover for diffusing or spreading out the light. In another embodiment, no such diffuser plate/lens/cover is provided between the LED lamps and the surfaces to be illuminated. In an alternate embodiment (not illustrated), one or more sides of the housing are not angled. Instead, the sides and edges of the housing are at right angles to one another, and the LED lamps themselves inside the housing are angled or tilted such that the greatest intensity of light is directed at 15-30 degrees forward from the vertical.

The one or more LEDs are attached to a small circuit board featuring a dropping resistor. The LEDs are arranged in the circuit such that each sees a voltage of about 1 to 4 volts, and preferably around 3.7 volts. Many LEDs are designed to operate in this voltage range. In the embodiment featuring multiple LEDs, the LEDs are electrically connected in parallel with one another, and the dropping resistor is placed in series with the LED collection. Preferably, the small circuit board and voltage divider are contained within the LED housing. Again, if low voltage AC electricity is used to power the system, rectification to DC may take place within the LED housing.

LEDs also are low current devices. Thus, the present outdoor lighting apparatus can be a low current, as well as a low voltage system. In the alternative, a large number of LED lights can be powered without drawing excessive amounts of electrical current.

The housing for the lights (LED or other) can be mounted at any convenient or desirable height along the vertical support. In an alternative, the housing can be mounted to the side or underside of the horizontal railing piece. Here, the housing may be arranged to support six or more LEDs arranged in a linear array called a "LED lighting strip". In either event, the lights are provided with sufficient length of two-conductor wire (for example, at least about 60 inches) that the connection to the wiring harness takes place below the deck surface. Furthermore, regardless of where the housing is mounted, the conductors will have to descend along the vertical support, with the plug or connector disappearing below the deck surface. If the vertical supports are wooden, and if this wood is exposed, a small, narrow groove or channel can be carved into the vertical support, for example, using a router, the groove being longitudinal with respect to the length of the vertical support. The wires for the light housing can then be stuffed into the groove, and held in place by a friction fit. In an alternative version, the electrical leads can be hidden behind a piece of molding that may be placed along a vertical edge of the vertical support. See Example 4, below.

Some deck designs, however, call for the vertical supports, and perhaps other portions of the deck, to be covered in decorative plastic, for example, to give the illusion that these pieces are painted. Such plastic for the vertical supports is hollow and of square cross section, and is designed to fit smoothly over a four-by-four inch wooden vertical support. Such plastic may be termed "vinyl" or "composite". In this case, the light housing is mounted to this plastic cover at the desired height. A hole is drilled or otherwise provided in the plastic cover behind the light housing so that the electrical leads for the light(s) of the housing can extend behind the plastic cover. There is sufficient gap or space between the plastic cover and the wood of the vertical support underneath that the electrical leads can descend the vertical support in this space without being pinched or other difficulty.

The wiring harness itself is largely hidden from view during use. It is envisioned that one of the electrical connectors may be above the deck surface during normal operation, for example, to connect to the power supply. Being largely out of sight, the wiring harness can be attached to the underside of the deck with staples or other fasteners. If the deck is designed to be very close to the ground, the deck may need to be pre-assembled, turned upside-down, have the wiring harness attached to it, and re-inverted.

The invention will now be described in more detail by way of examples, again with reference to the drawings. While the invention as claimed is not limited to these examples, they help to illustrate the invention, its uses, context and environment.

EXAMPLE 1

Figure 3:
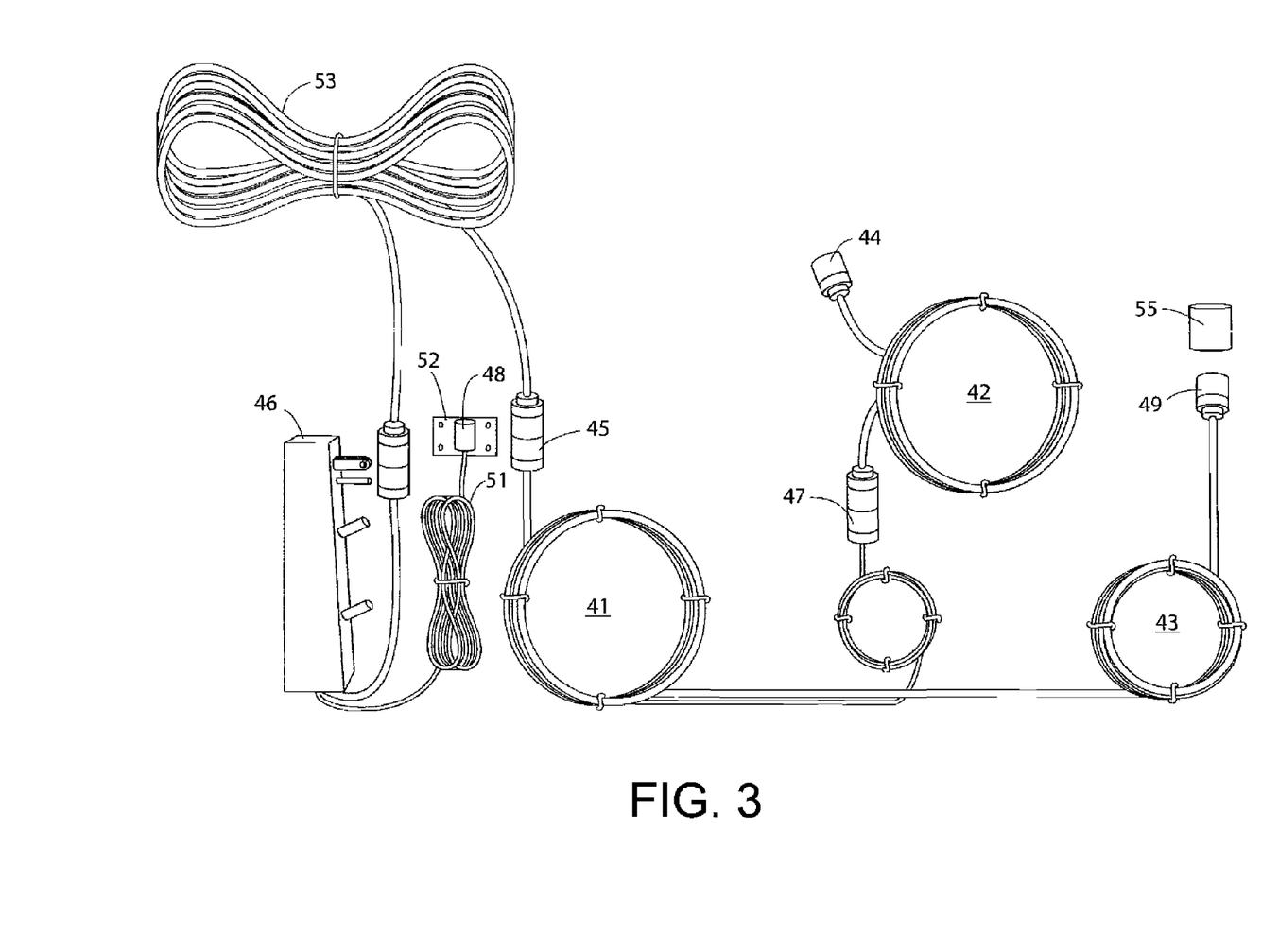
FIG. 3 shows the collection of the major components for the embodiment of the deck lighting apparatus described in Example 1.

This example demonstrates the procedure for lighting a deck via placement of lights on the vertical posts that support the railings of a deck. Except for the wire staples, FIG. 3 shows the collection of components in this embodiment of the deck lighting apparatus.

A list of components for this installation is as follows:
Light assembly unit with LED light and four color-matched screws
One 60-inch wire lead 42 with connector 44 to plug into LED light assembly
"T" harness featuring two 5-foot leads 41, 43 and three attached plugs 45, 47, 49
Five wire staples for mounting wire harness under the deck
Power supply with integrated AC plug 46, or with 96-inch AC power cord
Light sensor 48 with 30-96 inch electrical lead 51 and wall mounting bracket 52
30-foot power cable 53
Weather resistant cap 55 for terminating end of wiring harness To begin the installation, the installer first measures the distance to be sure that the first post to be illuminated is within thirty feet of a receptacle providing house current, which preferably is an outdoor receptacle.

After marking the location on the vertical support post ("the post") where the light is to be mounted, the installer drills a 7/16 inch diameter hole in the post sleeve (e.g., vinyl) material at this mark. For wooden posts, the installer cuts a 1/4 inch deep sawblade cut along the side of the post up to the desired height, and then continues this cut horizontally to the center front of the post. This groove will be for housing and hiding the wiring to the light unit on the post.

For the vinyl (or "composite") decking material, sleeves typically are provided that slide over four-by-four wooden posts. In this case, the installer runs the wire for the LED lighting units down the inside of the sleeve, with the smaller of the two connectors on this lead extending out of the 7/16 inch hole in the sleeve. The installer then slides the sleeve over the wooden post such that the larger connector hangs out of the bottom of the sleeve.

Figure 5:
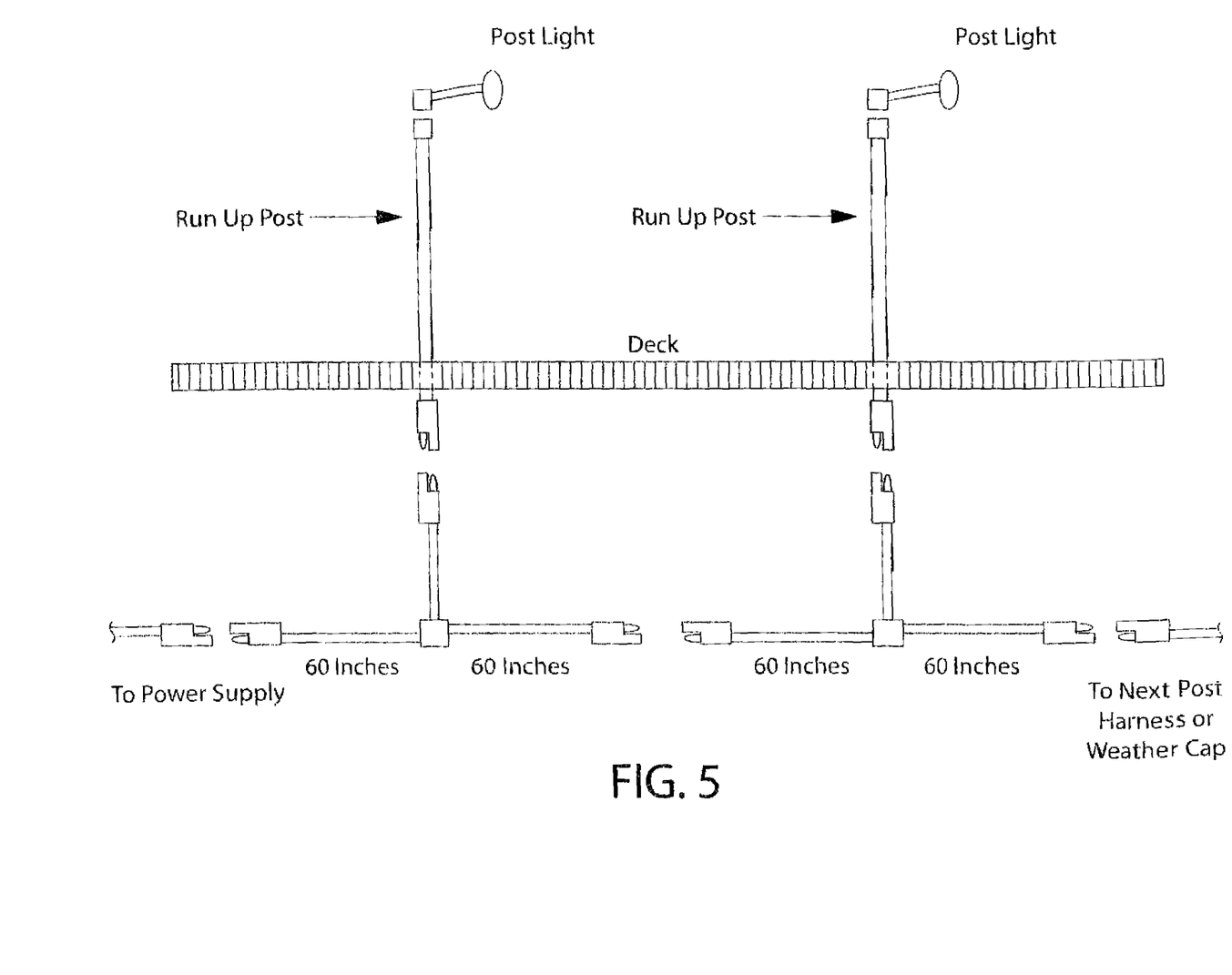
FIG. 5 shows how the "T" harnesses connect to one another and to the leads that connect the "T" harnesses to the lighting units of a post-mounted deck lighting apparatus.

Referring to FIG. 5, the installer then plugs together the "T" harness modules to connect the individual "T" harness modules together to create the wiring harness for the array of LED lighting units. At least fifty LED lighting units can be powered from a single power supply, simply by stringing "T" harness modules together, The installer can use a jumper or "extension" harness within the linear array of "T" harness modules if a vertical post is to be skipped, or if adjacent posts are separated by more than ten feet.

At the end of the array of "T" harness modules opposite the end that plugs into the power supply, the installer inserts a weather-resistant plug or end cap 55 into the plug.

The installer then fastens the assembled wiring harness to the underside of the deck using the supplied fasteners (wire staples, for example).

Returning attention now to the LED lighting unit, the installer connects the LED lighting unit connector to the connector extending out of the 7/16 inch hole in the post sleeve. These attached connectors will fit in the cavity in the back of the housing for the LED lighting unit.

Next, the installer positions the LED lighting unit on the vertical post, and attaches it to the post with the four screws provided. If the screws are to go into hardwood, pre-drilling of the screw holes may be required.

Then, one end of the 30-foot power cable is plugged into the first "T" harness module, and the other end is plugged into the power supply.

The installer determines a suitable location for the light sensor, which will turn the deck lights "on" at dusk, and "off"

at dawn. This should be a location where the sensor is exposed to natural light of the rising and setting sun. The installer should avoid heavily shaded areas as well as areas where artificial light may shine on the photocell sensor. Note that artificial light from porch lights, street lights, automobiles, etc. may cause the light sensor to prematurely turn the deck lights "off". The light sensor may be mounted vertically or horizontally.

A receptacle is provided on the power supply for mounting the light sensor there, if such is in an appropriate location. Alternatively, the installer may place the sensor at a remote area using the cable and wall mounting bracket provided. Still further, if the power supply is installed in a garage, the light sensor should be placed in a window, or routed through a ⅜ inch hole to the outside wall.

Finally, the installer plugs the power supply into the electrical outlet, and tests the operation of the lights by temporarily placing black electrical tape over the light sensor.

EXAMPLE 2

This example demonstrates the illumination of a set of outdoor stairs associated with a deck. This example also demonstrates other important aspects of the invention such as supplying the wiring for the light units from behind the riser of the steps.

A list of components for this installation is as follows:
For each step, a Light assembly unit with LED light and two screws
For each step, a "T" harness featuring one 30-inch long lead, and two 9-inch long leads each extending from one end of the 30-inch lead, and three attached plugs
Five wire staples for mounting wire harness behind staircase
Weather-resistant cap
Power supply
Light sensor with electrical lead and wall mounting bracket
6-foot power cable To begin the installation, the installer first determines the location of the power outlet. The lead to the first stair light must be available to plug to the power supply lead plug or to a wiring harness that links the stair lights to the vertical post-mounted lights (the "link harness").

The installer measures and marks the center of each stair riser, just below the tread, where the lights will be installed. If a landing is involved, it must be bridged with a five-foot extension cable.

Next, the installer drills a 7/16 inch diameter hole at the position marked. (If there is a center support stringer, angled drilling may be required.) The installer ensures that the drilling area on the back side of the stairs is clear.

Figure 6:
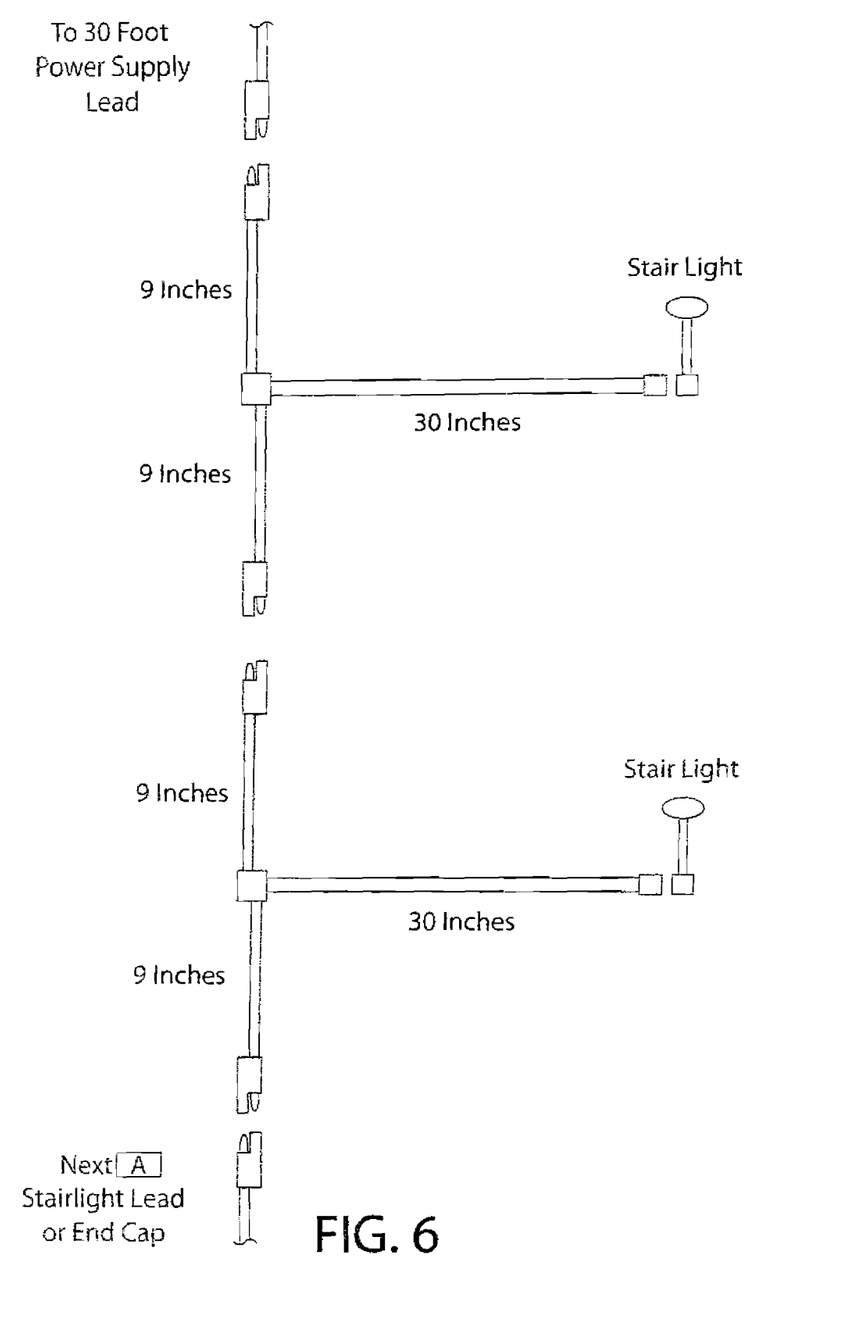
FIG. 6 shows how the "T" harnesses connect to one another and to the leads that connect the "T" harnesses to the lighting units of an outdoor stair lighting apparatus.

Then, and referring to FIG. 6, the installer attaches the lead from the power supply to the stair wiring harness plug The installer continues plugging together the electrical connectors of as many stair wiring harness modules as are needed to illuminate all of the stairs. One stair wiring harness module is needed for each stair to be lighted.

If the vertical posts are also to be illuminated, one end of a "stairs-to-posts" wiring harness link is plugged into the connector of the last (terminal) stair wiring harness module. The other end of this link harness is plugged into an connector of the post wiring harness. A similar link is also available for linking the stair wiring harness to the wiring arrangement for deck lights, e.g., lights mounted on the horizontal deck rails. If no such link is needed, the installer instead connects the terminal connector to the weather-resistant cap.

Next, the installer attaches the stair wiring harness to the underside of the stairs or joists using the wire fasteners (e.g., staples).

After this, the installer feeds the light assembly plug lead through the hole in the riser from the front to the back of the stair riser, and plugs this lead into the 30-inch lead of a stair wiring harness module. The installer feeds the excess wire material back through the hole.

Next, the installer mounts the light assembly over the drill hole, and fastens it to the riser using the two screws. (Pre-drilling of hardwoods may be required.)

Finally, the system is connected to the power supply, the power supply plugged into an outlet supplying house current, and the photocell light sensor mounted and tested, all as described in Example 1.

EXAMPLE 3

This example demonstrates one approach for retrofitting a wooden deck with a low voltage lighting system. The deck includes vertical posts measuring about 3 to 4 feet tall, and a horizontal hand railing between and connecting adjacent posts.

A wiring harness similar to that described in Example 1 is used in this retrofit. Notable differences include the fact that the electrical lead from the harness to the post light does not need to be as long. Also, and particularly if the vertical posts are separated by more than about 8 feet, a standard length harness may not be long enough, thus necessitating a custom-made harness. This retrofit will consist essentially of placing the wiring harness between the layers or upper and lower portions of the hand rail.

The hand rail for a deck has an upper and a lower portion or section, fastened together. The upper portion is sometimes being referred to as a hand rail "cap". The retrofit begins by the deck lighting installer removing the upper hand railing section from the lower section.

The installer then cuts a longitudinal groove in either the upper or lower section along the entire length of the railing. If a circular saw blade is of insufficient width to accommodate the wiring harness, a router having an appropriately sized bit may be used.

Next, the installer marks the position on the vertical post where the light unit will be mounted.

Somewhere within this marked area, but preferably close to the center of the area, the installer drills a hole in the vertical post, and directed toward the place where the wires transition from the hand railing to the vertical post. The hole is of sufficient diameter to accommodate the size of the electrical connector.

The conductors of the wiring harness may now be placed in the groove of the hand railing portion. The electrical lead from the light unit is fed through the drilled hole and connected to the electrical connector of the wiring harness. The connected connectors then can be pushed back into the hole.

The installer then places the upper portion of the hand railing or cap back onto the lower portion, and re-fastens the two together.

The light unit is then mounted to the vertical post with fasteners.

EXAMPLE 4

This example demonstrates another technique for retrofitting a wooden deck with a low voltage lighting system.

Here, the wiring harness will be positioned largely in accordance with Example 1. Instead of running electrical leads for the post lights in the annular space between the wooden post and the vinyl cover, however, a veneer or cap will be placed over the front of the wooden post, that is, the side facing toward the deck, with the lead running between the post and the veneer.

Accordingly, the installer cuts a piece of wooden veneer material of the same width, height and color as the existing wooden post.

Next, the installer cuts a longitudinal groove in the back of the veneer or in the front of the wooden post along its entire height. If the groove width is insufficient to accommodate the electrical leads for the post lights, a router may be used instead of a circular saw.

Then, the installer locates where on the veneer that he wants to position the light unit. He marks the boundaries of this region, and then drills a hole from the front through to the back of the veneer, preferably somewhere near the center of the marked region. The hole should be of sufficient size as to accommodate the electrical plug on the back of the light unit.

The installer then drills a vertical hole from the top of the deck surface to the bottom, and directly in front of the wooden post. This hole should be of sufficient size as to accommodate the electrical connector going from the wiring harness to the light unit.

With the wiring harness positioned under the deck, the installer runs an electrical lead for a post light up through the vertical hole in the deck. The plug from the light pack is then directed through the hole in the veneer, and connected to the connector coming from the wiring harness. The lead is placed into the groove in the veneer or post, and the veneer is fastened to the vertical post, substantially covering it. A small section of the groove may have to be widened to accommodate the plug and connector.

INDUSTRIAL APPLICABILITY

The wiring harness embodiments of the present invention should find utility in households, businesses large and small, public buildings, boats/ships, and in most any other setting where one has a need to illuminate in an efficient and unobtrusive way a horizontal surface from a horizontal or vertical member that is elevated above the surface to be illuminated.

One of ordinary skill in the art will readily appreciate the advantages flowing from the instant invention, among others, that the wiring harness is weather resistant (e.g., is protected at least against the adverse effects of water condensation), the electrical connections are secure and robust, that the wiring harness is expandable simply by plugging one or more additional harness modules as needed, and that the installation of deck and outdoor stair lighting is eased, simplified and speeded up by providing an apparatus where electrical components and leads are simply plugged into a wiring harness rather than cutting, stripping and connecting or soldering bare wires.

An artisan of ordinary skill will appreciate that various modifications may be made to the invention herein described without departing from the scope or spirit of the invention as defined in the appended claims.

What is claimed is:

1. A wiring harness featuring a "T" harness module, comprising:
    (a) a main electrical lead comprising at least two electrical conductors, said lead having a first end and an opposite end;
    (b) another electrical lead comprising at least two electrical conductors, said lead having one end spliced into said two electrical conductors of said main electrical lead, and an opposite end terminating in an electrical connector;
    (c) a first electrical connector electrically connected to said first end of said main electrical lead
    (d) a second electrical connector electrically connected to said opposite end of said main electrical lead;
    (e) wherein said first electrical connector and said second electrical connector (i) are identical too each other, and (ii) are interchangeable with the electrical connectors into which they plug.

2. The wiring harness of claim 1, wherein said first electrical connector comprises a prong or pin connected to one of said two electrical conductors, and a socket electrically connected to another of said two electrical conductors.

3. The wiring harness of claim 1, wherein said two electrical conductors of said another electrical lead are not of the same gauge as that of said two electrical conductors of said main electrical lead.

4. The wiring harness of claim 1, wherein said electrical connector of said another electrical lead is not interchangeable with said first electrical connector.

5. The wiring harness of claim 1, wherein said two electrical conductors of said another electrical lead are of the same gauge as that of said two electrical conductors of said main electrical lead.

6. The wiring harness of claim 1, wherein said electrical connector of said another electrical lead is interchangeable with said first electrical connector.

7. The wiring harness of claim 2, wherein said prong is nickel-plated.

8. The wiring harness of claim 2, further comprising a plastic body that is injection molded around a portion of said prong.

9. The wiring harness of claim 1, further comprising a housing at a location where said another electrical lead is spliced or tapped into said main electrical lead.

10. The wiring harness of claim 9, wherein said housing is impervious to water.

11. The wiring harness of claim 2, wherein said socket comprises a metal lining.

12. The wiring harness of claim 1, wherein said another electrical lead is tapped into said main electrical lead at the approximate middle of said main electrical lead.

13. The wiring harness of claim 1, wherein said main electrical lead has a length of about 10 feet.

14. The wiring harness of claim 1, wherein said another electrical lead has a length of about 5 feet.

15. A jumper or extension harness for a lighting system, comprising:
    (a) an electrical lead comprising at least two electrical conductors, said lead having a first end and an opposite end;
    (b) a first electrical connector electrically connected to said first end of said electrical lead
    (c) a second electrical connector electrically connected to said opposite end of said electrical lead;
    (d) wherein each of said first electrical connector and said second electrical connector (i) are arranged to engage corresponding electrical connectors in a linear arrangement, and (ii) at least one of said first electrical connector and said second electrical connector comprises a prong or pin comprising a bulged-out, flared or expanded region along a portion of the length of said prong; and
    (e) a lamp intended to be illuminated using electricity carried by said electrical lead.

16. A jumper or extension harness for a lighting system, comprising:
- (a) an electrical lead comprising at least two electrical conductors, said lead having a first end and an opposite end;
- (b) a first electrical connector electrically connected to said first end of said electrical lead
- (c) a second electrical connector electrically connected to said opposite end of said electrical lead;
- (d) wherein each of said first electrical connector and said second electrical connector (i) are arranged to engage corresponding electrical connectors in a linear arrangement, and (ii) at least one of said first electrical connector and said second electrical connector comprises a socket comprising a crimped, narrowed or restricted region along a portion of the length of said socket; and
- (e) a lamp intended to be illuminated using electricity carried by said electrical lead.

\* \* \* \* \*